US012634298B2

(12) United States Patent
Shachar et al.

(10) Patent No.: US 12,634,298 B2
(45) Date of Patent: May 19, 2026

(54) SECURITY POSTURE MANAGEMENT METHODS AND SYSTEMS USING THREAT DETECTION AND RESPONSE DATA

(71) Applicant: Skyhawk Security, Ramat Gan (IL)

(72) Inventors: Amir Shachar, Ramat Gan (IL); Chen Burshan, Omer (IL)

(73) Assignee: Skyhawk Security, Ramat Gan (IL)

( * ) Notice: Subject to any disclaimer, the term of this patent is extended or adjusted under 35 U.S.C. 154(b) by 162 days.

(21) Appl. No.: 18/141,486

(22) Filed: May 1, 2023

(65) Prior Publication Data

US 2024/0372876 A1     Nov. 7, 2024

(51) Int. Cl.
H04L 9/40          (2022.01)
H04L 41/16         (2022.01)
(52) U.S. Cl.
CPC .......... H04L 63/1416 (2013.01); H04L 41/16 (2013.01)
(58) Field of Classification Search
CPC ........................... H04L 41/16; H04L 63/1416
See application file for complete search history.

(56) References Cited

U.S. PATENT DOCUMENTS

| | | | | |
|---|---|---|---|---|
| 2019/0098037 A1* | 3/2019 | Shenoy, Jr. | ......... | H04L 63/1441 |
| 2020/0050986 A1* | 2/2020 | Vescio | ............... | H04L 63/1425 |
| 2021/0185077 A1* | 6/2021 | Shavlik | .............. | H04L 63/1433 |
| 2022/0215467 A1* | 7/2022 | Virk | ..................... | G06N 3/0895 |
| 2024/0135279 A1* | 4/2024 | Gong | ............ | G06Q 10/063118 |
| 2024/0289609 A1* | 8/2024 | Birru | ........................ | G06N 3/08 |
| 2024/0330446 A1* | 10/2024 | Bulut | .................. | G06N 3/0895 |

* cited by examiner

*Primary Examiner* — Dhairya A Patel
*Assistant Examiner* — Eui H Kim
(74) *Attorney, Agent, or Firm* — Rivka Friedman

(57)          ABSTRACT
Computerized methods and systems obtain a plurality of first data sets associated with a plurality enterprises. Each first data set is associated with a corresponding one of the enterprises and has data indicative of activity performed in association with the corresponding enterprise. The plurality of first data sets is processed using a first LLM to produce, from each first data set, a second data set that provides a summary of a sequence of events that occurred on the enterprise corresponding to first data set. At least some of the second data sets, which are associated with a proper subset of the enterprises, are processed using a second LLM to identify patterns. For an enterprise not in the proper subset, a current security posture of the enterprise is processed together with the identified patterns to produce a recommended security posture for the enterprise.

17 Claims, 3 Drawing Sheets

SECURITY POSTURE MANAGEMENT METHODS AND SYSTEMS USING THREAT DETECTION AND RESPONSE DATA

TECHNICAL FIELD

The present disclosure relates to methods, systems, and computer program products for improving the security posture of enterprises.

BACKGROUND OF THE INVENTION

Cloud computing has become an integral part of modern-day businesses. By offering several advantages, such as cost savings, scalability, flexibility, and accessibility, cloud computing is a preferred choice for hosting critical business applications and data. However, cloud computing poses several security risks, including data breaches, unauthorized access, and cyber-attacks. To mitigate these risks, companies invest in Cloud Security Posture Management (CSPM) solutions that enable management of cloud security posture effectively.

Although CSPM services are widely used in the field of cybersecurity, the effectiveness of conventional CSPM services can be limited due to static expert rules relying on historical attack data. This approach can become obsolete as cyber attackers develop new methods to bypass conventional security measures. In response to this challenge, some recent industry attempts have introduced remediation steps after triggering a malicious alert. Unfortunately, these remediation steps are often too late to prevent the attack.

SUMMARY OF THE INVENTION

The present disclosed subject matter, also referred to herein as the disclosure, includes methods, systems, and computer program products for improving the security posture of enterprises. Aspects of the present disclosure provide improvements to CSPM solutions by leveraging Cloud Threat Detection and Response (CDR) data. According to embodiments of the present disclosure, the leveraging of CDR data is enabled by employing a generative artificial intelligence (AI) system, in particular generative AI that utilize large language models (LLMs), such as ChatGPT, the capabilities of which are leveraged in order to efficiently generate suggested improvements and remediations to the security posture of enterprises. As is generally understood in the art, generative AI systems use generative models such as LLMs to statistically sample new data based on the training data set that was used to create the generative AI system. Generative AI systems have various capabilities, typically dependent upon the modality of the data set used for training. For example, for text modality, a generative AI system, such as ChatGPT, is trained on words or word tokens, and is capable of executing natural language processing (NLP) tasks.

Embodiments of the present disclosure are directed to a method for improving security posture of enterprises. The method comprises: obtaining a plurality of first data sets associated with a plurality enterprises, each first data set associated with a corresponding one of the enterprises and having data indicative of activity performed in association with the corresponding one of the enterprises; processing the plurality of first data sets using a first large language model (LLM) to produce, from each first data set, a second data set that provides a summary of a sequence of events that occurred on the enterprise corresponding to first data set;

processing at least some of the second data sets using a second LLM to identify atypical patterns in the at least some of the second data sets, the at least some of the data sets associated with a proper subset of the plurality of enterprises; and for an enterprise not in the proper subset of plurality of the enterprises, processing a current security posture of the enterprise together with the identified patterns to produce a recommended security posture for the enterprise.

Optionally, processing the current security posture of the enterprise together with the identified patterns includes applying a third LLM.

Optionally, the first LLM, the second LLM, and the third LLM are the same LLM.

Optionally, processing the current security posture of the enterprise together with the identified patterns includes applying a set of rules and policies.

Optionally, processing the current security posture of the enterprise together with the identified patterns includes applying a machine learning model.

Optionally, the first LLM and the second LLM are the same LLM.

Optionally, each enterprise includes at least one network, and obtaining the plurality of first data sets includes: for each enterprise, obtaining data indicative of activity performed by one or more devices of the enterprise on the at least one network.

Optionally, for each enterprise the at least one network includes at least one virtual private network.

Optionally, the plurality of first data sets is raw data having a large set of input tokens.

Optionally, the plurality of first data sets is derived by pre-processing raw data having a large set of input tokens such that the plurality of first data sets have a reduced set of input tokens.

Embodiments of the present disclosure are directed to a computer system for improving security posture of enterprises. The computer system comprises: a non-transitory storage medium for executing computer components; and a computerized processor for executing the computer components. The computer components comprise: a threat detection module configured to obtain a plurality of first data sets associated with a plurality enterprises, each first data set associated with a corresponding one of the enterprises and having data indicative of activity performed in association with the corresponding one of the enterprises, a summarization module configured to implement a first large language module (LLM) and process the plurality of first data sets using the first LLM so as to produce, from each first data set, a second data set that provides a summary of a sequence of events that occurred on the enterprise corresponding to first data set, a pattern identification module configured to implement a second LLM and process at least some of the second data sets using the second LLM to identify atypical patterns in the at least some of the second data sets, the at least some of the data sets associated with a proper subset of the plurality of enterprises, and a remediation suggestion module configured to process, for an enterprise not in the proper subset of plurality of the enterprises, a current security posture of the enterprise together with the identified patterns to produce a recommended security posture for the enterprise.

Optionally, the remediation suggestion module is configured to process the current security posture of the enterprise together with the identified patterns by applying a third LLM.

Optionally, the first LLM, the second LLM, and the third LLM are the same LLM.

Optionally, the remediation suggestion module is configured to process the current security posture of the enterprise together with the identified patterns by applying a set of rules and policies.

Optionally, the remediation suggestion module is configured to process the current security posture of the enterprise together with the identified patterns by applying a machine learning model.

Optionally, the first LLM and the second LLM are the same LLM.

Optionally, each enterprise includes at least one network, and the threat detection module obtains the plurality of first data sets by: for each enterprise, obtaining data indicative of activity performed by one or more devices of the enterprise on the at least one network.

Optionally, for each enterprise the at least one network includes at least one virtual private network.

Optionally, the plurality of first data sets is raw data having a large set of input tokens.

Optionally, the threat detection module is associated with a pre-processing module configured to derive the plurality of first data sets from raw data having a large set of input tokens such that the plurality of first data sets have a reduced set of input tokens.

Embodiments of the present disclosure are directed to a computer usable non-transitory storage medium having a computer program embodied thereon for causing a suitably programmed system to improve security posture of enterprises, by performing the following steps when such program is executed on the system. The steps comprise: obtaining a plurality of first data sets associated with a plurality enterprises, each first data set associated with a corresponding one of the enterprises and having data indicative of activity performed in association with the corresponding one of the enterprises; processing the plurality of first data sets using a first large language model (LLM) to produce, from each first data set, a second data set that provides a summary of a sequence of events that occurred on the enterprise corresponding to first data set; processing at least some of the second data sets using a second LLM to identify atypical patterns in the at least some of the second data sets, the at least some of the data sets associated with a proper subset of the plurality of enterprises; and for an enterprise not in the proper subset of plurality of the enterprises, processing a current security posture of the enterprise together with the identified patterns to produce a recommended security posture for the enterprise.

This document references terms that are used consistently or interchangeably herein. These terms, including variations thereof, are as follows:

A "computer" includes machines, computers and computing or computer systems (for example, physically separate locations or devices), servers, gateways, computer and computerized devices, processors, processing systems, computing cores (for example, shared devices), and similar systems, workstations, modules, and combinations of the aforementioned. The aforementioned "computer" may be in various types, such as a personal computer (e.g., laptop, desktop, tablet computer), or any type of computing device, including mobile devices that can be readily transported from one location to another location (e.g., smart phone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software-based emulation of a computer.

Unless otherwise defined herein, all technical and/or scientific terms used herein have the same meaning as commonly understood by one of ordinary skill in the art to which the disclosure pertains. Although methods and materials similar or equivalent to those described herein may be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present disclosure are herein described, by way of example only, with reference to the accompanying drawings. With specific reference to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

Attention is now directed to the drawings, where like reference numerals or characters indicate corresponding or like components. In the drawings.

DESCRIPTION OF THE PREFERRED EMBODIMENTS

Figure 1:
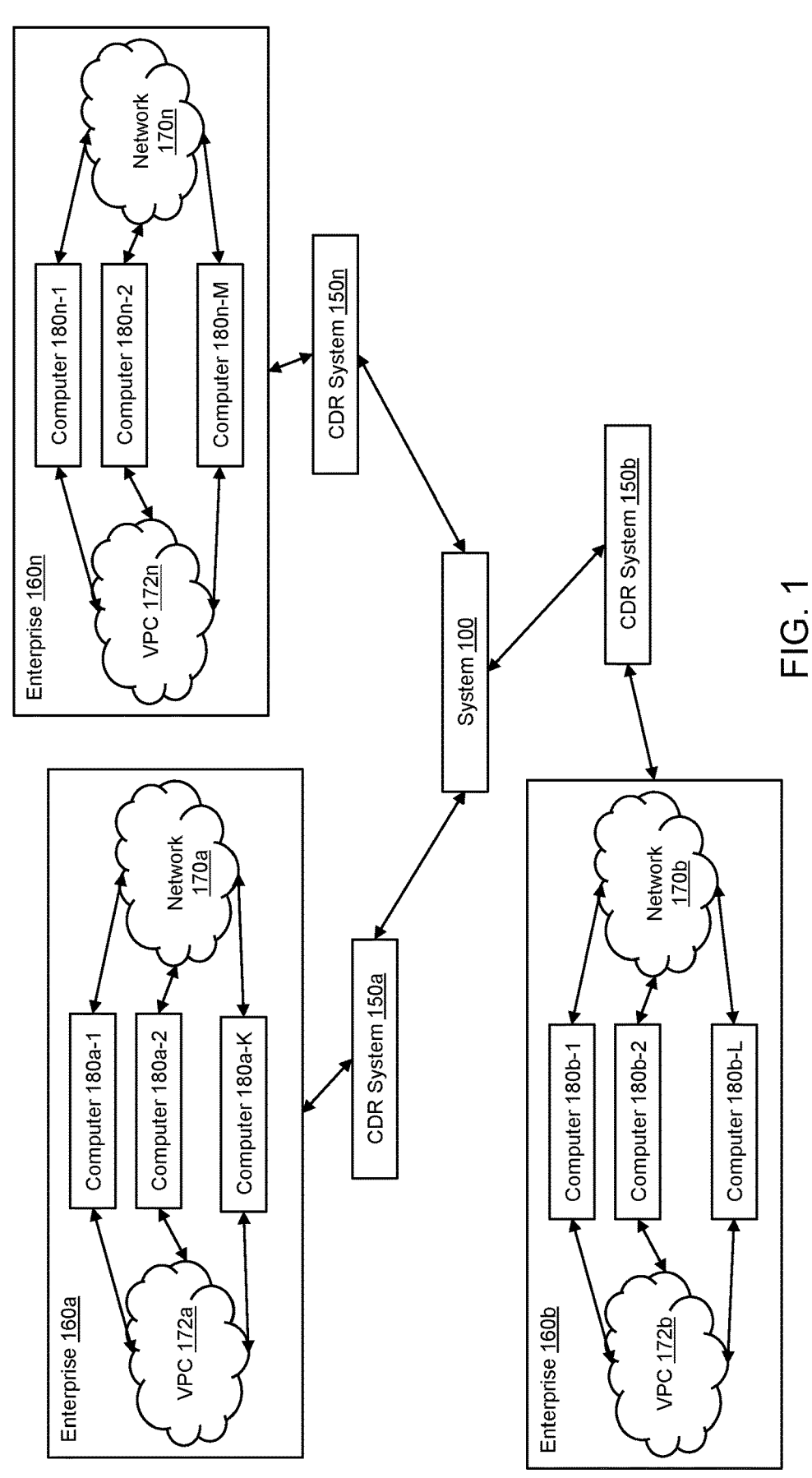
FIG. 1 is a diagram illustrating a system environment in which embodiments of a system according to the disclosed subject matter can operate.

The present disclosure is directed to methods, systems, and computer program products for improving the security posture of enterprises.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the examples. The disclosure is capable of other embodiments or of being practiced or carried out in various ways.

As will be appreciated by one skilled in the art, aspects of the present disclosure may be embodied as a system, a method, or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present disclosure may take the form of a computer program product embodied in one or more non-transitory computer readable (storage) medium(s) having computer readable program code embodied thereon.

Refer now to the drawings, FIG. 1 shows an example environment in which the disclosed subject can operate. As illustrated, a system 100 according to embodiments of the disclosure is connected, for example via one or more networks (not shown), to CDR systems 150a-150n, which function to monitor the environment of corresponding enterprises 160a-160n and to generate CDR data therefrom. Parenthetically, "n" denotes the last number of a series, and can be any positive integer value, typically greater than or equal to 2. In the illustrated embodiment, each CDR system is connected to a respective enterprise, for example via a one or more networks (not shown).

Each of the enterprises 160a-160n includes a plurality of computers, for example endpoint client computers, servers, gateways, databases, or any other type of device that falls within the definition of a "computer" as defined above, that are connectable to, or form part of, one or more networks of the enterprise, including one or more virtual private clouds (VPCs). Thus, for example, the enterprise 160a can support computers 180a-1-180a-K (where "K" can be any positive integer) that are linked or otherwise connectable to one or more networks of the enterprise 160a, including, for example network 170a and VPC 172a. Similarly, for example, the enterprise 160b can support computers 180b-1-180b-L (where "L" can be any positive integer) that are linked or otherwise connectable to one or more networks of the enterprise 160b, including, for example network 170b and VPC 172b. Similarly, for example, the enterprise 160n can support computers 180n-1-180n-M (where "M" can be any positive integer) that are linked or otherwise connectable to one or more networks of the enterprise 160n, including, for example network 170n and VPC 172n.

As mentioned, each of the CDR systems 150a-150n functions to monitor the environment (preferably the virtual cloud environment) of the enterprise 160a-160n to which the CDR system is connected, and to generate CDR data therefrom. In particular, each CDR system monitors the (cloud) environment of its corresponding enterprise for suspicious activity occurring on or in relation to the enterprise, and generates CDR data sets, for example including alert data, based on, for example, predefined rules and thresholds. The suspicious activity can include, for example, activity that is indicative of, or is otherwise associated with, malicious attacks on the enterprise. The CDR data sets that are generated by each CDR system 150a-150n are typically of (or can be converted to) data types/formats that use human-readable text (e.g., JavaScript Object Notation or JSON). The CDR data sets are indicative of activity (typically suspicious activity) performed on, or otherwise in association with, the enterprise 160a-160n with which the CDR system is connected.

The following is a non-exhaustive list of examples of cases for which data (e.g., alert data), that can contribute to CDR data sets, can be generated by the CDR system associated with an enterprise to indicate suspicious activity (including malicious attacks): the error rate of a specific user (e.g., one of the enterprise computers) is higher than a predefined threshold, a user (e.g., one of the enterprise computers) applies an API that is not common to the user group it belongs to, one or more machines (computers) of the enterprise are invoked at an unusual rate.

The CDR data sets generated by each CDR system 150a-150n are provided to the system 100. In other words, the system 100 collects (or accumulates) the CDR data sets generated by the CDR systems 150a-150n, such that the system 100 obtains a plurality of the CDR data sets.

Figure 2:
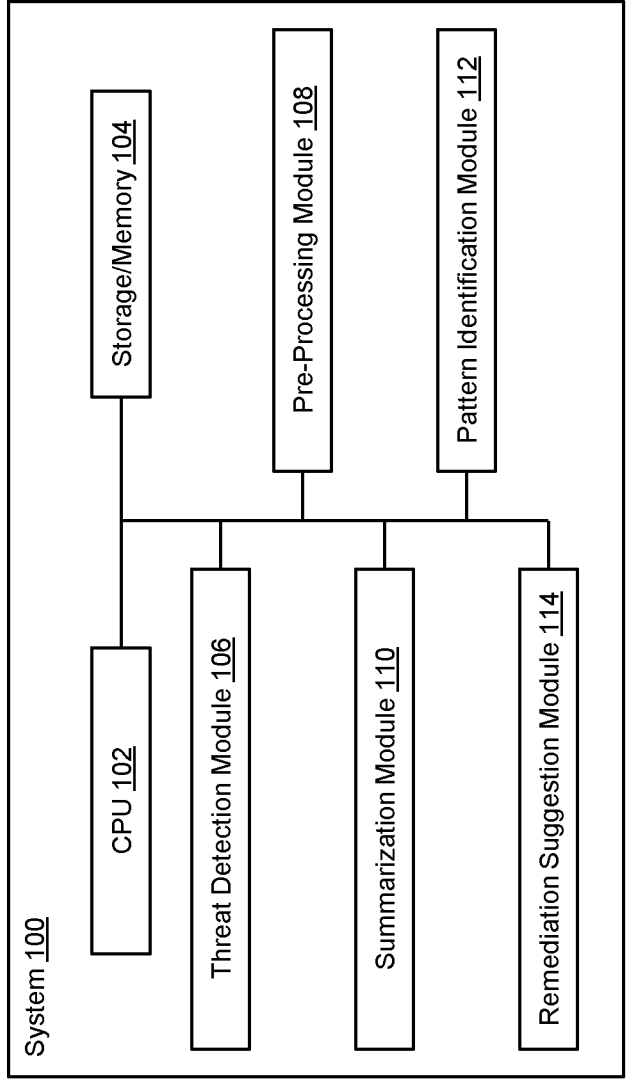
FIG. 2 is a diagram of the architecture of an exemplary system embodying the disclosed subject matter.

With continued reference to FIG. 1, refer also to FIG. 2 which shows an example architecture of the system 100 according to a non-limiting embodiment of the present disclosure. The system 100 includes multiple components in hardware and/or software. Although the components of the system 100 are shown in a single block, the components do not all have to be collocated. For example, the components of the system 100 can be spread throughout different location, and can be connected to each other through one or more networks, for example a cloud network.

The system 100 includes one or more processors in a central processing unit (CPU) 102 linked to storage/memory 104. The CPU 102 is in turn, linked to components (computerized components or modules), such as a threat detection module 106, a pre-processing module 108 (which can be optional), a summarization module 110, a pattern identification module 112, and a remediation suggestion module 114. While these components 102-114 are the most germane to the system 100, other components are permissible. Parenthetically, the term "linked" as used herein, includes both wired and/or wireless links, either direct or indirect, such that the components 102-114, are in electronic and/or data communications with each other, either directly or indirectly. As used herein, a "module", for example, includes a component for storing instructions (e.g., machine readable instructions) for performing one or more processes, and including or associated with processors, e.g., the CPU 102, for executing the instructions.

Figure 3:
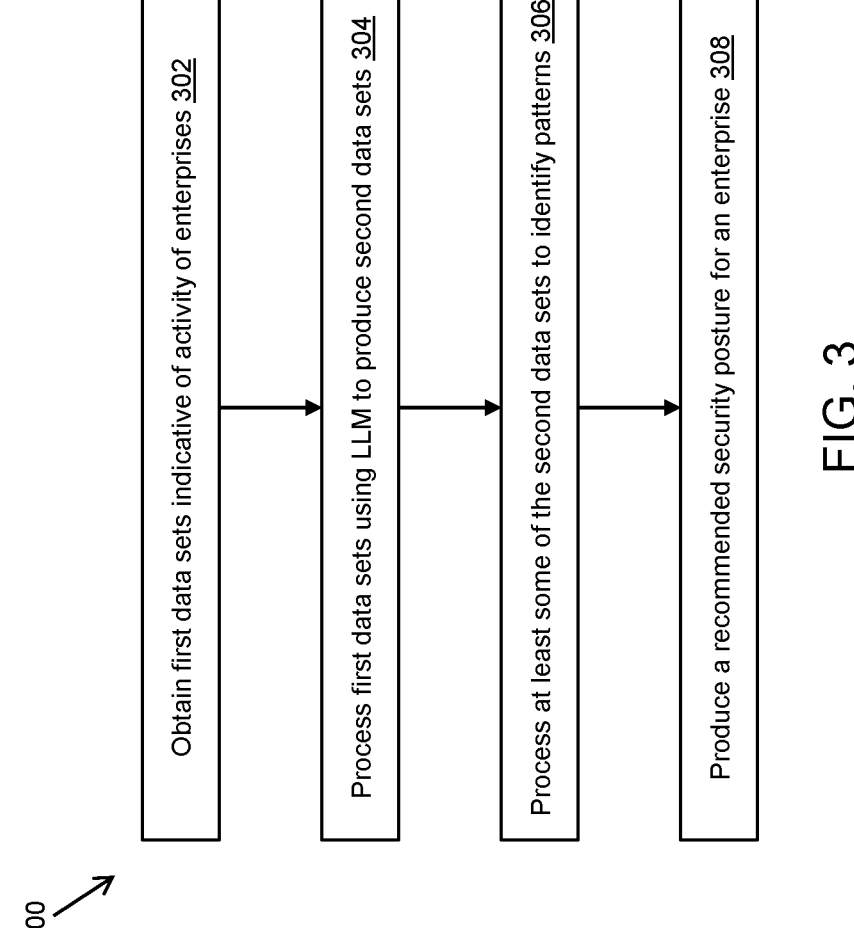
FIG. 3 is a flow diagram illustrating a process for improving the security posture of enterprises according to embodiments of the present disclosure.

The CPU 102 is formed of one or more processors, including hardware processors, and performs methods of the disclosure, as shown in FIG. 3 and detailed below. The methods of FIG. 3 may be in the form of programs, algorithms, and the like. For example, the processors of the CPU 102 may include x86 Processors from AMD (Advanced Micro Devices) and Intel, Xenon® and Pentium® processors from Intel, as well as any combinations thereof.

The storage/memory 104 stores machine-executable instructions executed by the CPU 102 for performing the methods of the disclosure (e.g., as shown in FIG. 3). The storage/memory 104, for example, may also provide temporary storage for the system 100.

The threat detection module 106 operates to receive the CDR data sets from the various CDR systems 150a-150n so as to collect or accumulate a plurality of CDR data sets that are indicative of activity (preferably suspicious activity) performed on, or otherwise in association with, the enterprises 160a-160n. In certain embodiments, the threat detection module 106 produces a consortium or bucket that consists of all of the raw CDR data sets received from the CDR systems 150a-150n. In other embodiments, as will be discussed, the consortium or bucket consists of filtered (pre-processed) CDR data sets. It is noted that in certain embodiments, the functions performed by the CDR systems 150a-150n can be integrated into the system 100, for example as part of the threat detection module 106. Thus, for example, embodiments are contemplated in which the threat detection module 106 includes multiple sub-modules, each being associated with a respective one of the enterprises 160a-160n, and each performing the function of a CDR system.

The summarization module 110 operates to process input data, for example the plurality of CDR data sets (or filtered versions thereof), to produce, from each CDR data set, a summary data set that provides a summary of a sequence of events that occurred on the enterprise corresponding to CDR data set. The summarization module 110 utilizes a text-modality generative AI system, in particular by implementing and utilizing a large language model (LLM), such as, for example ChatGPT (developed by OpenAI) or a similar LLM or a system that executes the LLM used by ChatGPT or similar LLM, or any other suitable third-party LLM or in-house (e.g., proprietary) LLM, or a system that executes such an LLM. More specifically, the summarization module 110 processes at least some (and typically all) of the CDR data sets (or pre-processed versions thereof) using natural language processing (NLP) techniques to concisely describe the network structure (also referred to as VPC structure) of each enterprise. The VPC structure typically includes static parameters, for example, links and/or connections between VPC components, including, for example, connections between databases and gateways of the enterprise, open ports, exploitations of ports, etc. The summarization module 110 processes the CDR data sets (or pre-processed versions thereof) offline (i.e., after the period of time over which the CDR data sets were generated), and generates concise summaries (or "stories") based on sequences of events (e.g., suspicious sequences) that occurred online over a given period of time (i.e., time period) over which the CDR data sets were generated. The period of time is typically a day, but smaller time periods, for example 12-hour periods, and larger time periods, for example 2-day periods, can be used. Since the CDR data sets are typically types/formats that use human-readable text (e.g., JSON), the human-readable text can be provided as an input prompt to the LLM of the summarization module 110 to produce the summary data sets.

In certain embodiments, the CDR data sets collected by the threat detection module 106 are provided to the summarization module 110 as raw CDR data (i.e., unfiltered CDR data that includes all activity performed on, or otherwise in association with, the enterprises). It is noted, however, that one of the characteristics of LLMs in general is their limited context, for example input character token limit, which can require various types of workarounds, including, for example, sharding and summarization. Thus, although the raw CDR data can be provided to the summarization module 110, this raw CDR data may approach or go beyond the context (token) limit of the LLM used by the summarization module 110, which can create a processing bottleneck at the summarization module 110. Therefore, according to certain embodiments, the system 100 employs the pre-processing module 108, which operates to pre-processes the CDR data sets collected by the threat detection module 106 in order to reduce the set of input tokens provided to the summarization module 110. The pre-processing module 108 can employ sharding and/or summarization techniques, as known in the art, to pre-process the CDR data sets collected by the threat detection module 106.

In certain non-limiting embodiments, the pre-processing module 108 utilizes a text-modality generative AI system, in particular by implementing and utilizing an LLM, to reduce the size of the input token set provided to the summarization module 110 from a large set to a reduced-sized set (i.e., a set smaller than the large set). The LLM implemented by the pre-processing module 108 may be the same LLM implemented by the summarization module 110, or may be a different LLM (i.e., the pre-processing module 108 and the summarization module 110 may use the same generative AI system or use different generative AI systems). The raw CDR data sets (e.g., JSON files) from the threat detection module 106 can be provided as input to the LLM of the pre-processing module 108 such that the pre-processing module 108 identifies what subsets of data in the JSON files are considered as suspicious or potentially malicious in order to produce "focused data sets" that contain substantially only the suspicious or potentially malicious subsets of the CDR data, which can be provided as input to the summarization module 110. For example, if the raw CDR data sets include innocuous activities, such as API calls made by a computer of an enterprise that are commonly applied by the user group to which the computer belongs, the pre-processing module 108 can filter out that innocuous activity from the JSON files. On the other hand, particularly suspicious activities, such as user error rate higher than a predefined threshold, uncommon application of an API, etc., can be retained in the "focused data sets" by the pre-processing module 108.

It is noted that in certain embodiments, each of the CDR systems 150a-150n can be equipped with a pre-processing module 108, such that the CDR data sets that are provided to the threat detection module 106 are filtered data sets. In such embodiments, the threat detection module 106 can provide pre-processed input directly to the summarization module 110.

The pattern identification module 112 operates to receive at least some of the summary data sets from the summarization module 110 and to identify similar patterns in the received summary data sets. The summary data sets processed by the pattern identification module 112 correspond to only some (i.e., a proper subset) of the enterprises (i.e., only those enterprises associated with the CDR data that is used to generate the summary data sets). The patterns identified by the pattern identification module 112 are atypical patterns, for example relative to historical patterns, and are indicative of atypical activity (i.e., suspicious activity) carried out on or in association with the enterprises. The atypical patterns can be, for example, patterns of user computer error rate above a threshold, patterns of suspicious API calls by users (for example API calls by unauthorized users or users outside of a user group that typically makes such API calls), patterns of user computer invocations above a threshold rate, and the like. The pattern identification module 112 utilizes a text-modality generative AI system, in particular by implementing and utilizing an LLM, to identify the atypical patterns. The LLM implemented by the pattern identification module 112 may be the same LLM implemented by the summarization module 110 and/or the pre-processing module 108, or may be a different LLM (i.e., the pattern identification module 112 and the summarization module 110 and/or the pre-processing module 108 may use the same generative AI system or use different generative AI systems).

The remediation suggestion module 114 operates to process, for an enterprise whose summary data set did not contribute to the pattern identification (i.e., an enterprise that is not in the proper subset of enterprises), a current security posture of the enterprise (which can be described in a data type/format that uses human-readable text, for example a JSON file) together with the patterns identified by the pattern identification module 112 to produce a recommended security posture for the enterprise. The remediation suggestion module 114 may operate on individual patterns identified by the pattern identification module 112, on one or more groups of patterns (e.g., concatenations of identified patterns, such as pattern strings), or combinations thereof.

In operation of the system 100, for example, the threat detection module 106 may obtain a plurality of raw CDR data sets from ten CDR systems connected to ten corresponding (respective) enterprises. The pre-processing module 108 may filter the plurality of raw CDR data sets to produce a reduced-sized set of input tokens ("focused data sets") as the consortium (bucket) of CDR data sets, which are provided to the summarization module 110. The summarization module 110 in turn processes the consortium of CDR data sets to produce, for each of the ten enterprises, a corresponding summary data set that is a summary of the sequence of events that occurred on the enterprise, thereby concisely describing the network structure (VPC structure) of each enterprise in the corresponding summary data set. The pattern identification module 112 may then select some of the summary data sets as a proper subset (corresponding to a proper subset of enterprises) to process, for example the pattern identification module 112 may select summary data sets corresponding to only seven of the ten enterprises, in order to identify atypical patterns among the selected summary data sets. The remediation suggestion module 114 can then process the identified patterns together with the current security posture of any one of the remaining (for example three) enterprises not in the proper subset of (for example seven) enterprises upon which the summary data sets were produced to produce a recommended security posture for that enterprise.

In certain embodiments, the remediation suggestion module 114 utilizes a text-modality generative AI system, in particular by implementing and utilizing an LLM, in order to generate the security posture recommendation for the enterprise based on the current security posture of the enterprise and the identified patterns. In such embodiments, the LLM implemented by the remediation suggestion module 114 may be the same LLM implemented by one or more of the other modules 108-112, or may be a different LLM (i.e., the remediation suggestion module 114 and one or more of the other modules 108-112 may use the same generative AI system or use different generative AI systems).

In other embodiments, the remediation suggestion module 114 processes the current security posture of the enterprise and the identified patterns using a set of rules and policies to generate the security posture recommendation for the enterprise. In yet other embodiments, the remediation suggestion module 114 processes the current security posture of the enterprise and the identified patterns using a machine learning model to generate the security posture recommendation for the enterprise.

As alluded to above, in certain embodiments, the modules 106-114 use the same LLM to perform their respective functions. Thus, for example the modules 106-114 can all use the same text-modality generative AI system, such as for example ChatGPT or a similar LLM, or generative AI systems using the same third-party LLM or the same in-house proprietary LLM, to perform their respective functions.

Attention is now directed to FIG. 3 which shows a flow diagram detailing a computer-implemented process 300 in accordance with embodiments of the disclosed subject matter. This computer-implemented process includes an algorithm for, among other things, improving the security posture of enterprises connected or otherwise linked to the system 100. Reference is also made to the elements shown in FIGS. 1 and 2. The process and sub-processes of FIG. 3 are computerized processes performed by various components of, or otherwise associated with, the system 100, including the CDR systems 150*a*-150*n*, the threat detection module 106, the pre-processing module 108, the summarization module 110, the pattern identification module 112, and the remediation suggestion module 114. The aforementioned process and sub-processes of FIG. 3 are for example, performed automatically, but can be, for example, performed manually, and are performed, for example, in real time.

The process 300 begins at step 302, where the system 100 obtains first data sets that are indicative of activity of (i.e., on or otherwise associated with) enterprises 160*a*-160*n*. These first data sets can be, in certain embodiments, raw CDR data sets collected by the threat detection module 106 via the CDR systems 150*a*-150*n* (for example unfiltered JSON files), but can also be focused data sets resultant from pre-processing of the raw CDR data sets by the pre-processing module 108 (e.g., filtered JSON files). Alternatively, as discussed above, the first data sets can also be pre-filtered data sets collected by the threat detection module 106 (i.e., filtered by pre-processing modules embedded in each of the CDR systems 150*a*-150*n* to produce pre-filtered data, e.g., pre-filtered JSON files).

At step 304, the system 100, and in particular the summarization module 110, processes the first data sets received from the threat detection module 106 (or the pre-processing module 108) using an LLM (for example using the ChatGPT text-modality generative AI system, or the LLM utilized by ChatGPT, or any other suitable LLM) to produce second data sets (summary data sets). Step 304 can be performed by providing the filtered CDR data sets to the LLM of the summarization module 110 as part of an input prompt, for example together with an appropriate text prompt (which can be one of a plurality of text prompts stored in a memory associated with the system 100, for example storage/ memory 104), such that the summarization module 110 outputs, for each of the CDR data sets (associated with a respective one of the enterprises 160*a*-160*n*), a corresponding summary data set that is a summary (preferably a filtered summary) of the sequence of events that occurred on the enterprise, thereby outputting a concise description of the network structure (e.g., the VPC structure) of each enterprise in the corresponding summary data set. The summary data sets are also typically of data types/formats that use human-readable text, for example JSON files.

At step 306, the system 100, and in particular the pattern identification module 112, receives some or all of the summary data sets and processes some of the summary data sets (i.e., a proper subset of summary data sets) using an LLM (for example using the ChatGPT text-modality generative AI system, or the LLM utilized by ChatGPT, or any other suitable LLM). Step 306 can be performed by providing the proper subset of the summary data sets to the LLM of the pattern identification module 112 as an input prompt, for example together with an appropriate text prompt (which can be one of a plurality of text prompts stored in a memory associated with the system 100, for example storage/ memory 104), such that the pattern identification module 112 outputs, for the proper subset of summary data sets, one or more atypical patterns in the subset of summary data sets. It is noted that in certain embodiments, step 306 may be repeated using other of the summary data sets as input to the LLM.

At step 308, the system 100, and in particular the remediation suggestion module 114, processes one or more of the patterns (identified at step 306), either individually or in groups of patterns or some combination thereof, together with data (e.g., a JSON file) that is descriptive of the current security posture of one of the enterprises 160*a*-160*n* that is not in the proper subset of enterprises that is associated with the proper subset of summary data sets that was used to perform step 306, in order to produce a recommended security posture for the enterprise. In embodiments in which the remediation suggestion module 114 implements an LLM, step 306 can be performed by providing one or more of the patterns (identified/generated at step 306) to the LLM of the remediation suggestion module 114 as an input prompt, together with the data that is descriptive of the current security posture of an enterprise not in the proper subset, and for example together with an appropriate text prompt (which can be one of a plurality of text prompts stored in a memory associated with the system 100, for example storage/memory 104), such that the remediation suggestion module 114 generates as output, for the enterprise not in the proper subset, a recommended security posture for that enterprise.

Step 308 can be repeated for each enterprise that is not in the proper subset of enterprises that is associated with the proper subset of summary data sets that was used to perform step 306. It is noted that in certain cases, the recommended security posture for a given enterprise (at step 308) may be to take no action to change the current security posture. For example, if the current security posture of the enterprise provides sufficient security against potential threats identified in the patterns, no security posture change may be needed. In other cases, if the current security posture of the enterprise provides insufficient security against potential threats identified in the patterns, the recommended security posture may indicate that more strict security measures are needed in order to proactively protect against threats identified in the patterns.

As mentioned above, the aforementioned process and sub-processes of FIG. 3 are for example, performed automatically, but can be, for example, performed manually. In addition, the transition between each step (sub-process) of the process 300 may be automatic, but in certain embodiments there may be human intervention between one or more of the steps of the process 300 for verification and/or quality assurance purposes. By way of one non-limiting example, a human system administrator may intervene at the conclusion of step 306 in order to review the patterns identified by the system 100 to ensure that the identified pattern make logical sense from a human perspective. Also as discussed above, at each of certain stages of the process 300, data is provided as part of an input prompt to an appropriate module of the system 100 together with an appropriate text prompt. Each of these text prompts can, as discussed above, be one of a plurality of text prompts stored in a memory associated with the system 100, for example storage/memory 104. The plurality of text prompts can, for example, be generated by the system 100 or, for example, provided as input to the system 100, for example from an external source (such as a repository that contains applicable text prompts) or by an administrator of the system 100. In addition, the appropriate text prompt for each module of the system 100 can, in certain embodiments, be automatically selected by the appropriate module of the system 100.

As evident from the description above, the system 100 and method 300 according to certain embodiments of the present disclosure enables the automated generation of concise descriptions of the network structure of enterprises, the automated identification of certain suspicious patterns in the activity of enterprises (based on the generated descriptions) which can result in exploitation of assets of those enterprises or other enterprises coupled to the system 100, and enables proactive adjustment of the security posture of other enterprises that could be exposed to security risks according to those identified patterns. The generation of the concise descriptions and the identification of atypical (suspicious) patterns, and in certain embodiments the proactive adjustment of security posture, is enabled by the processing of large data sets using LLMs, allowing for efficient and comprehensive security posture management. In particular, by automating the generation of concise descriptions of the network structure (e.g., VPC structure) and automating the pattern detection, using LLMs, the system 100 and method 300 according to embodiments of the present disclosure provides a more efficient and effective way to manage enterprise security posture, and in particular enterprise cloud security posture, and enables adaption to new threats and attack patterns, which provides a significant advantage over conventional CSPM solutions.

The following paragraphs provide some examples of use cases and input prompts that can be provided to the various modules of the system 100. Characters in brackets ("[ ]") are dummy names and/or variables used solely for the purposes of illustration and explanation only.

For example, with continued reference to FIGS. 1-3, consider a consortium of CDR data sets (that have been pre-processed/filtered) formed from CDR data sets obtained from a set of enterprises (e.g., 10 enterprises). The consortium of CDR data sets is such that the CDR data sets are of reduced token size and are, in essence, limited to include primarily (or only) data that is descriptive of suspicious or potentially malicious behavior/activity that occurred on the set of enterprises over a given period of time (e.g., one day). The consortium of CDR data sets could be generated by the pre-processing module 108 by providing each of the raw CDR data sets together with a text prompt as part of an input prompt to the LLM of the pre-processing module 108. For example, the text prompt used for filtering each raw CDR sets could be "filter the following script or JSON file, that describes activity on an enterprise, such that only activities of user computer error rate above a threshold [X], user computer API calls, and user computers invocation above rate [Y], remain in the script or JSON file, and define or categorize these remaining activities as suspicious activities or potentially malicious activities".

Each of the CDR data sets that forms the consortium of CDR data sets is then provided as input to the summarization module 110 together with a text prompt as part of an input prompt to the LLM of the summarization module 110. For example, the text prompt used as input to the LLM of the summarization module 110 could be "concisely summarize the activity in each of the following scripts or JSON files over a period of [D] days that begins on date [A] and ends on date [B]". As a result, the summarization module 110 may produce summary data sets, where each summary data set corresponds to a respective enterprise and represents a concise summary of activities (that occurred on that enterprise) in the form of user computer error rate above a threshold, API calls, and user computer invocations above a threshold rate.

A proper subset of the summary data sets is selected (corresponding to a proper subset of enterprises) and forms, together with a text prompt, an input prompt to the LLM of the pattern identification module 112. For example, the text prompt used as input to the LLM of the pattern identification module 112 could be "identify patterns in the activities described in the following scripts or JSON files". As a result, the pattern identification module 112 may produce as output a data set having one or more patterns that correspond to suspicious activity, for example, an exploitation of ports "P1" and "P2" in response to a connection between a gateway and database.

The remediation suggestion module 114 then processes the patterns together with the current security posture of one of the enterprises in the set of enterprises that is not part of the proper subset of enterprises, and produces as output a recommended security posture for the enterprise. For example, if the remediation suggestion module 114 implements an LLM, the pattern (or patterns) can form, together with the current security posture of the enterprise and a text prompt, an input prompt to the LLM of the remediation suggestion module 114. For example, if an identified pattern is "an exploitation of ports "P1" and "P2" in response to a connection between a gateway and database", the text prompt can be, for example, "given the following pattern of an exploitation of ports "P1" and "P2" in response to a connection between a gateway and database, and given the following script or JSON file that is descriptive of the current security posture of enterprise [G], what modification in security posture, if any, would be recommended to ensure that enterprise [G] is not susceptible to a security breach described in the pattern?"

The implementation of the method and/or system of embodiments of the disclosure can involve performing or completing selected tasks manually, automatically, or a combination thereof. Moreover, according to actual instrumentation and equipment of embodiments of the method and/or system of the disclosed subject matter, several selected tasks could be implemented by hardware, by software or by firmware or by a combination thereof using an operating system.

For example, hardware for performing selected tasks according to embodiments of the disclosure could be implemented as a chip or a circuit. As software, selected tasks according to embodiments of the disclosed subject matter could be implemented as a plurality of software instructions being executed by a computer using any suitable operating system. In an exemplary embodiment of the disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present disclosure. A non-transitory computer readable (storage) medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

The above-described methods including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The methods and systems, including components thereof, herein have been described with exemplary reference to specific hardware and software. The processes methods have been described as exemplary, whereby specific steps and their order can be omitted and/or changed by persons of ordinary skill in the art to reduce these embodiments to practice without undue experimentation. The methods and systems have been described in a manner sufficient to enable persons of ordinary skill in the art to readily adapt other hardware and software as may be needed to reduce any of the embodiments to practice without undue experimentation and using conventional techniques.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the disclosed subject matter has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for improving security posture of enterprises, the method comprising:

obtaining a plurality of first data sets associated with a plurality of enterprises, each first data set associated with a cloud environment of a corresponding one of the enterprises and having data indicative of activity performed in association with the cloud environment of the corresponding one of the enterprises;

processing the plurality of first data sets using a first large language model (LLM) to generatively produce, from each first data set, a second data set that provides a summary of a sequence of events that occurred on the enterprise corresponding to first data set, wherein the summary is human-readable text;

processing at least some of the second data sets using a second LLM to identify atypical patterns in the at least some of the second data sets, the at least some of the second data sets associated with a proper subset of the plurality of enterprises that includes at least two enterprises, wherein said atypical patterns are characteristic of activity spanning across the at least two enterprises and are related to security risks; and for an enterprise not in the proper subset of plurality of the enterprises, processing a current cloud security posture of the enterprise together with the identified atypical patterns to produce a recommended cloud security posture for the enterprise, wherein the recommended cloud security posture is based, at least in part, on a comparison of the current cloud security posture with the identified atypical patterns;

wherein processing the current security posture of the enterprise together with the identified patterns includes applying a third LLM; wherein the first LLM, the second LLM, and the third LLM are the same LLM.

2. The method of claim 1, wherein processing the current security posture of the enterprise together with the identified patterns includes applying a set of rules and policies.

3. The method of claim 1, wherein processing the current security posture of the enterprise together with the identified patterns includes applying a machine learning model.

4. The method of claim 1, wherein the first LLM and the second LLM are the same LLM.

5. The method of claim 1, wherein each enterprise includes at least one network, and wherein obtaining the plurality of first data sets includes: for each enterprise, obtaining data indicative of activity performed by one or more devices of the enterprise on the at least one network.

6. The method of claim 5, wherein for each enterprise the at least one network includes at least one virtual private network.

7. The method of claim 1, wherein the plurality of first data sets is raw data having a large set of input tokens.

8. The method of claim 1, wherein an LLM pre-processes the plurality of first data sets is derived by pre-processing raw data having a large set of input tokens to generate the plurality of first data sets such that the plurality of first data sets have a reduced set of input tokens.

9. The method of claim 1, wherein the second data set is a concise description of the network structure of the enterprise.

10. A computer system for improving security posture of enterprises, the computer system comprising:

a non-transitory storage medium for executing computer components; and a computerized processor for executing the computer components comprising:

a threat detection module configured to obtain a plurality of first data sets associated with a plurality of enterprises, each first data set associated with a cloud environment of a corresponding one of the enterprises and having data indicative of activity performed in association with the cloud environment of the corresponding one of the enterprises, a summarization module configured to implement a first large language module (LLM) and process the plurality of first data sets using the first LLM so as to generatively produce, from each first data set, a second data set that provides a summary of a sequence of events that occurred on the enterprise corresponding to first data set, wherein the summary is human-readable text, a pattern identification module configured to implement a second LLM and process at least some of the second data sets using the second LLM to identify atypical patterns in the at least some of the second data sets, the at least some of the second data sets associated with a proper subset of the plurality of enterprises that includes at least two enterprises, wherein said atypical patterns are characteristic of activity spanning across the at least two enterprises and are related to security risks, and a remediation suggestion module configured to process, for an enterprise not in the proper subset of plurality of the enterprises, a current cloud security posture of the enterprise together with the identified atypical patterns to produce a recommended cloud security posture for the enterprise, wherein the recommended cloud security posture is based, at least in part, on a comparison of the current cloud security posture with the identified atypical patterns;

wherein the remediation suggestion module is configured to process the current security posture of the enterprise together with the identified patterns by applying a third LLM; wherein the first LLM, the second LLM, and the third LLM are the same LLM.

11. The computer system of claim 10, wherein the remediation suggestion module is configured to process the current security posture of the enterprise together with the identified patterns by applying a set of rules and policies.

12. The computer system of claim 10, wherein the remediation suggestion module is configured to process the current security posture of the enterprise together with the identified patterns by applying a machine learning model.

13. The computer system of claim 10, wherein the first LLM and the second LLM are the same LLM.

14. The computer system of claim 10, wherein each enterprise includes at least one virtual private network, and wherein the threat detection module obtains the plurality of first data sets by: for each enterprise, obtaining data indicative of activity performed by one or more devices of the enterprise on the at least one virtual private network.

15. The computer system of claim 10, wherein the plurality of first data sets is raw data having a large set of input tokens.

16. The computer system of claim 10, wherein the threat detection module is associated with a pre-processing module configured to implement an LLM to pre-process derive the plurality of first data sets from raw data having a large set of input tokens to generate the plurality of first data sets such that the plurality of first data sets have a reduced set of input tokens.

17. A computer usable non-transitory storage medium having a computer program embodied thereon for causing a suitably programmed system to improve security posture of enterprises, by performing the following steps when such program is executed on the system, the steps comprising:

obtaining a plurality of first data sets associated with a plurality of enterprises, each first data set associated with a cloud environment of a corresponding one of the enterprises and having data indicative of activity performed in association with the cloud environment of the corresponding one of the enterprises;

processing the plurality of first data sets using a first large language model (LLM) to generatively produce, from each first data set, a second data set that provides a summary of a sequence of events that occurred on the enterprise corresponding to first data set, wherein the summary is human-readable text;

processing at least some of the second data sets using a second LLM to identify atypical patterns in the at least some of the second data sets, the at least some of the second data sets associated with a proper subset of the plurality of enterprises that includes at least two enterprises, wherein said atypical patterns are characteristic of activity spanning across the at least two enterprises and are related to security risks; and for an enterprise not in the proper subset of plurality of the enterprises, processing a current cloud security posture of the enterprise together with the identified atypical patterns to produce a recommended cloud security posture for the enterprise, wherein the recommended cloud security posture is based, at least in part, on a comparison of the current cloud security posture with the identified atypical patterns;

wherein processing the current security posture of the enterprise together with the identified patterns includes applying a third LLM; wherein the first LLM, the second LLM, and the third LLM are the same LLM.

\* \* \* \* \*